(12) United States Patent
Ritter

(10) Patent No.: US 10,137,878 B2
(45) Date of Patent: Nov. 27, 2018

(54) METHOD FOR CONTROLLING A PARKING BRAKE SYSTEM

(71) Applicant: AKEBONO BRAKE INDUSTRY CO., LTD., Chuo-ku, Tokyo (JP)

(72) Inventor: George Ritter, Flat Rock, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 55 days.

(21) Appl. No.: 15/290,716

(22) Filed: Oct. 11, 2016

(65) Prior Publication Data

US 2017/0106848 A1    Apr. 20, 2017

Related U.S. Application Data

(60) Provisional application No. 62/241,340, filed on Oct. 14, 2015.

(51) Int. Cl.
*B60T 13/74* (2006.01)
*B60T 13/66* (2006.01)
(Continued)

(52) U.S. Cl.
CPC .......... *B60T 13/741* (2013.01); *B60T 13/662* (2013.01); *F16D 65/18* (2013.01); *F16D 65/22* (2013.01);
(Continued)

(58) Field of Classification Search
CPC .... B60T 13/741; B60T 13/746; B60T 17/221; B60T 8/171; B60T 8/172; F16D 65/18; F16D 2121/24; F16D 2125/40
(Continued)

(56) References Cited

U.S. PATENT DOCUMENTS 6,959,794 B2  11/2005  Ralea et al.
7,699,751 B2   4/2010  Barber et al.
(Continued)

FOREIGN PATENT DOCUMENTS

DE    102012205576 A1   10/2013
DE    102014009126 A1    6/2016
(Continued)

OTHER PUBLICATIONS

Extended European Search Report and Opinion for European Patent Application No. 16193927.7; dated Mar. 6, 2017.

*Primary Examiner* — Thomas W Irvin
(74) *Attorney, Agent, or Firm* — The Dobrusin Law Firm, P.C.

(57) ABSTRACT

A method that includes steps of measuring voltage and current of the parking brake system during creation of a parking brake apply or release of the parking brake apply. The method includes estimating motor position, motor speed, and a current draw of the motor using the measured voltage and the measured current. The method includes estimating a parking brake force with the estimated motor position. The method includes correcting the estimated motor position, motor speed, and the current draw of the motor with the measured current, and/or correcting the estimated parking brake force with the corrected estimated motor position, corrected motor, and the corrected current draw of the motor. The method includes determining the creation of the parking brake apply with the corrected parking brake force and/or determining release of the parking brake apply with the corrected estimated motor position.

20 Claims, 5 Drawing Sheets

(51) Int. Cl.
*F16D 65/18* (2006.01)
*F16D 65/22* (2006.01)
F16D 121/24 (2012.01)
F16D 125/40 (2012.01)
F16D 125/60 (2012.01)

(52) U.S. Cl.
CPC ...... *F16D 2121/24* (2013.01); *F16D 2125/40* (2013.01); *F16D 2125/60* (2013.01)

(58) Field of Classification Search
USPC ............................................. 303/20; 701/70
See application file for complete search history.

(56) References Cited

U.S. PATENT DOCUMENTS

| | | | | |
|---|---|---|---|---|
| 7,748,793 | B2* | 7/2010 | Hartmann | B60T 13/741 188/72.2 |
| 7,992,691 | B2* | 8/2011 | Maron | B60T 13/588 188/156 |
| 8,397,879 | B2* | 3/2013 | Maron | B60T 13/588 188/158 |
| 8,794,720 | B2 | 8/2014 | Schumann et al. | |
| 8,825,326 | B2 | 9/2014 | Jeon | |
| 8,886,433 | B2* | 11/2014 | Konishi | B60T 8/885 318/362 |
| 8,972,140 | B2* | 3/2015 | Kotake | B60T 13/741 701/70 |
| 9,145,114 | B2 | 9/2015 | Bajorat | |
| 9,205,814 | B2 | 12/2015 | Yabuguchi | |
| 9,205,918 | B2 | 12/2015 | Cahill | |
| 9,260,099 | B2 | 2/2016 | Sussek | |
| 9,272,692 | B2 | 3/2016 | Bieltz et al. | |
| 9,297,433 | B2 | 3/2016 | Takewaki et al. | |
| 9,302,656 | B2 | 4/2016 | Köth et al. | |
| 9,308,900 | B2 | 4/2016 | Holzmacher et al. | |
| 9,308,901 | B2 | 4/2016 | Foitzik et al. | |
| 9,321,439 | B2 | 4/2016 | Baehrle-Miller et al. | |
| 9,340,192 | B2 | 5/2016 | Schwarz et al. | |
| 9,346,446 | B2 | 5/2016 | Kim | |
| 9,347,507 | B2 | 5/2016 | Choe et al. | |
| 9,403,521 | B2 | 8/2016 | Williams et al. | |
| 9,409,555 | B2 | 8/2016 | Yamamoto et al. | |
| 9,434,361 | B2 | 9/2016 | Hauber et al. | |
| 9,434,368 | B2 | 9/2016 | Ohara et al. | |
| 9,446,752 | B2 | 9/2016 | Sato | |
| 9,457,688 | B2 | 10/2016 | Morita et al. | |
| 9,457,774 | B2 | 10/2016 | Knechtges | |
| 9,505,385 | B2* | 11/2016 | Yasui | F16D 55/225 |
| 2006/0001392 | A1* | 1/2006 | Ajima | B62D 5/046 318/432 |
| 2008/0048596 | A1* | 2/2008 | Konishi | B60T 7/042 318/372 |
| 2008/0091326 | A1* | 4/2008 | Watanabe | B60T 13/741 701/70 |
| 2010/0308645 | A1* | 12/2010 | Maron | B60T 13/588 303/20 |
| 2011/0073423 | A1 | 3/2011 | Moon | |
| 2011/0224880 | A1 | 9/2011 | Baehrle-Miller et al. | |
| 2011/0278105 | A1* | 11/2011 | Maron | B60T 13/588 188/72.1 |
| 2012/0193177 | A1 | 8/2012 | Goto et al. | |
| 2013/0338895 | A1 | 12/2013 | Bieltz et al. | |
| 2013/0338896 | A1 | 12/2013 | Baehrle-Miller et al. | |
| 2014/0151164 | A1 | 6/2014 | Yokoyama | |
| 2014/0284151 | A1 | 9/2014 | Yokoyama et al. | |
| 2015/0066324 | A1 | 3/2015 | Baehrle-Miller et al. | |
| 2015/0166032 | A1 | 6/2015 | No | |
| 2015/0316371 | A1 | 11/2015 | Böhm et al. | |
| 2015/0344007 | A1 | 12/2015 | Lee | |
| 2015/0344013 | A1 | 12/2015 | Knechtges et al. | |
| 2015/0344014 | A1 | 12/2015 | Knechtges et al. | |
| 2015/0360656 | A1 | 12/2015 | Masuda | |
| 2015/0360663 | A1 | 12/2015 | Svensson et al. | |
| 2015/0369317 | A1 | 12/2015 | Choe et al. | |
| 2016/0001753 | A1 | 1/2016 | Georgin et al. | |
| 2016/0010668 | A1 | 1/2016 | Kim et al. | |
| 2016/0025169 | A1 | 1/2016 | Holder et al. | |
| 2016/0053839 | A1 | 2/2016 | Putz | |
| 2016/0054494 | A1 | 2/2016 | Kitagawa et al. | |
| 2016/0075319 | A1 | 3/2016 | Kistner et al. | |
| 2016/0090069 | A1 | 3/2016 | Jeon | |
| 2016/0090071 | A1 | 3/2016 | Tuhro et al. | |
| 2016/0091036 | A1 | 3/2016 | Shank et al. | |
| 2016/0103430 | A1 | 4/2016 | Baehrle-Miller et al. | |
| 2016/0107623 | A1 | 4/2016 | No | |
| 2016/0129893 | A1 | 5/2016 | Ishino et al. | |
| 2016/0144842 | A1 | 5/2016 | Jeon et al. | |
| 2016/0176388 | A1 | 6/2016 | Baehrle-Miller et al. | |
| 2016/0176389 | A1* | 6/2016 | Baehrle-Miller | B60T 8/171 701/70 |
| 2016/0207514 | A1 | 7/2016 | Knechtges et al. | |
| 2016/0221547 | A1 | 8/2016 | No | |
| 2016/0221554 | A1 | 8/2016 | Knechtges et al. | |

FOREIGN PATENT DOCUMENTS

| | | |
|---|---|---|
| EP | 2483117 B1 | 1/2016 |
| EP | 1633611 B1 | 3/2016 |
| EP | 3009314 A1 | 4/2016 |
| EP | 1849667 B1 | 9/2016 |
| EP | 2955408 A1 | 12/2016 |
| KR | 1020100108013 A | 10/2010 |
| WO | 2016/150697 A1 | 6/2016 |

* cited by examiner

ND OF PAGE

METHOD FOR CONTROLLING A PARKING BRAKE SYSTEM

FIELD

The present teachings relate generally to controlling a parking brake system. More particularly, these teachings relate to determining a position of a motor and/or an actuator assembly; creation and/or release of a parking brake force, or a combination thereof.

BACKGROUND

Parking brake systems are used to create a parking brake force to prevent movement of a stopped or parked vehicle. In disc brake systems, the parking brake system moves a pair of opposing brake pads into engagement with a brake rotor to create the parking brake force. In drum-in-hat brake systems, the parking brake system moves a pair of brake shoes radially outward against the drum portion of a brake rotor to create the parking brake force.

In some applications, parking brake systems are electromechanical systems that include a motor and an actuator assembly for moving the brake pads or the brake shoes against the brake rotor, or the drum portion of a brake rotor, respectively, to create the parking brake force. Some known parking brake systems use a position sensor to determine a position of the actuator assembly and/or a position of one or more brake pistons to determine that the parking brake force has been created or released.

However, to reduce cost, space, and weight, and to comply with updated vehicle guidelines and recommendations, it may be desirable to have a parking brake system that does not include such a position sensor. That is, instead of a position sensor, it may be desirable to have control logic capable of accurately estimating and determining the position of the actuator assembly, a brake piston, a motor, or a combination thereof in order to determine that the parking brake force has been created or released. It may be attractive to have an accurate system or model for relating translational displacement of an actuator assembly and/or brake piston to a parking brake force.

Some examples of controlling a parking brake system are disclosed in U.S. Patent Application Numbers US 2013/338895 and US 2013/338896, and in U.S. Pat. Nos. 8,794,720 B2 and 8,825,326 B2, all of which are expressly incorporated by reference herein for all purposes.

SUMMARY

The present teachings provide a parking brake system. More specifically, the teachings herein provide a method for controlling a parking brake system. The present teachings provide a method of accurately estimating and determining a position of a motor, a position of an actuator assembly and its components, a position of a brake piston, an amount of parking brake force, release of a parking brake force or a combination thereof.

One unique aspect of the present teachings includes a method of accurately estimating and determining the position of the motor, the actuator assembly, and/or the brake piston, creation of the parking brake force, release of the parking brake force, an amount of parking brake force, or a combination thereof without using a position sensor, like a Hall Effect circuit.

These teachings provide a novel and accurate system or model for relating translational displacement of an actuator assembly and/or the brake piston to as parking brake force. These teachings provide a novel and accurate system or model for relating translational displacement of an actuator assembly and/or the brake piston to a parking brake force without relying on a position sensor.

A method that includes steps of measuring voltage and current of the parking brake system during creation of a parking brake apply or release of the parking brake apply. The method includes estimating motor position, motor speed, and a current draw of the motor using the measured voltage and the measured current. The method includes estimating a parking brake force with the estimated motor position. The method includes correcting the estimated motor position, motor speed, and the current draw of the motor with the measured current, and/or correcting the estimated parking brake force with the corrected estimated motor position, corrected motor, and the corrected current draw of the motor. The method includes determining the creation of the parking brake apply with the corrected parking brake force and/or determining release of the parking brake apply with the corrected estimated motor position.

The present teachings provide a method of controlling an electric parking brake system. The method includes a step of measuring a voltage and a current of the electric parking brake system during at parking brake apply or release of the parking brake. The method includes a step of using the measured voltage and the measured current to estimate a position of the motor, the spindle, and/or nut, and/or to estimate a clamping force or a parking brake force of the brake pads or the brake shoes against a braking surface. The method includes a step of linearizing the non-linear dynamics about an operating load of the parking brake system to determine a verified position of the motor, the spindle, and/or the nut and/or a verified parking brake force.

DETAILED DESCRIPTION

Figure 1:
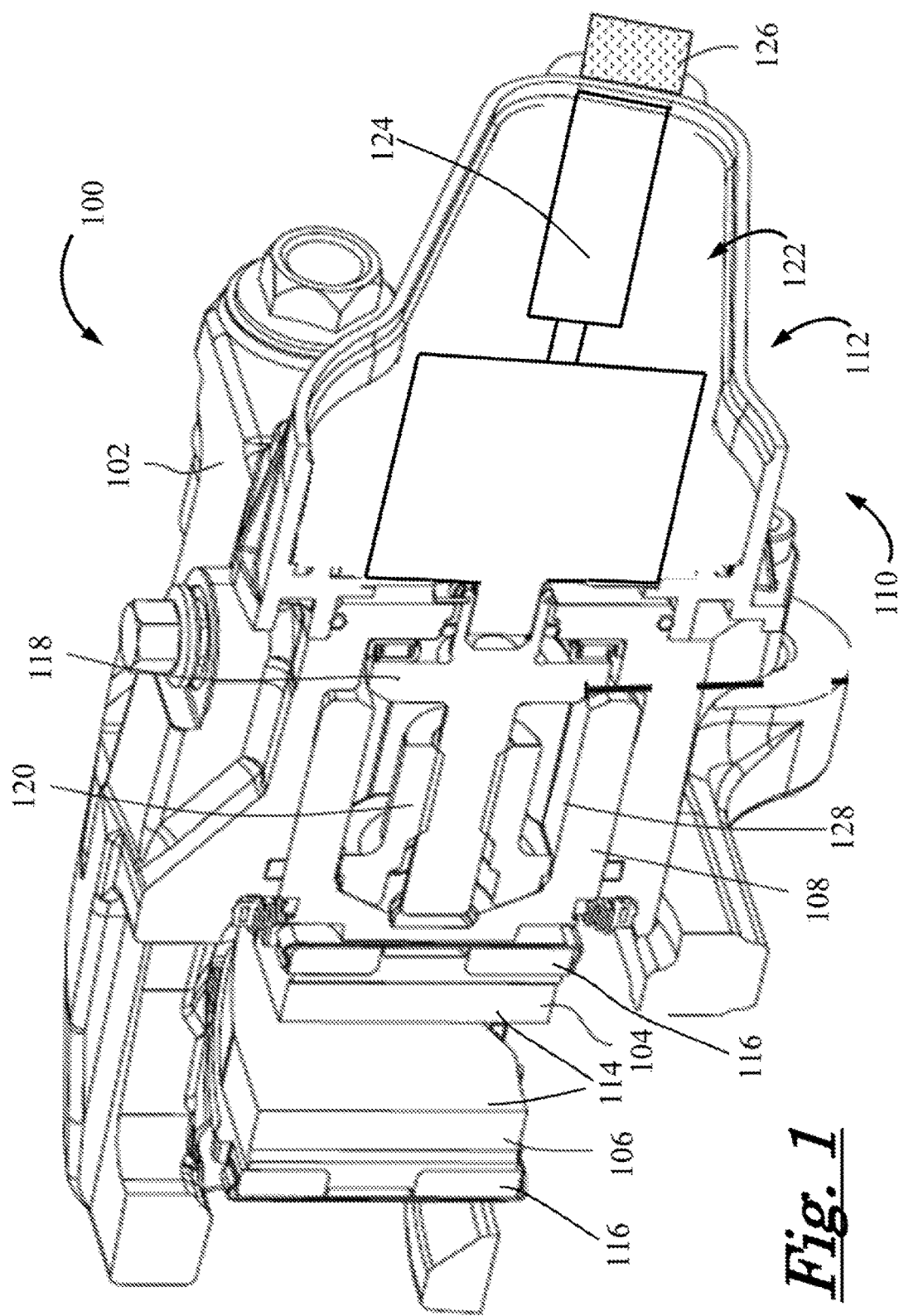
FIG. 1 is a perspective cross-sectional view of a brake system including a motor on caliper parking brake system.

This application claims the benefit of U.S. Provisional Application No. 62/241,340 filed on Oct. 14, 2015, the entire disclosure of which is hereby incorporated by reference herein for all purposes.

The explanations and illustrations presented herein are intended to acquaint others skilled in the an with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing a method for controlling a parking brake system. The present teachings provide a method of accurately estimating and determining the position of a motor, the actuator assembly, and/or the brake piston without using one or more position sensors. The teachings herein provide an accurate system for determining a parking brake force. The teachings herein provide an accurate system or model for relating translational displacement of an actuator assembly and/or a brake piston to the parking brake force.

The present teachings make use of a brake system. The brake system may be any device, system, and/or assembly that may create a braking force. For example, the brake system may be a disc brake system, a drum brake system, a drum-in-hat brake system, or a combination thereof. The braking force may be created during a standard application of the service brake. The braking force may be any force that, when coupled with a brake pad or a brake shoe coefficient of friction, slows, stops, and/or prevents movement or rotation of a brake rotor or a brake drum, respectively; slows, stops, and/or prevents movement of a vehicle; or a combination thereof. The disc brake system may include a brake rotor, one or more brake pads, and a brake caliper supporting one or more brake pistons and the parking brake system, which may include a motor gear unit (MGU) and an actuator assembly. The drum-in-hat brake system may include a drum brake, one or more brake shoes, and a backing plate supporting the parking brake system, which may include a motor and an actuator assembly.

The brake rotor may cooperate with the components of the disc brake system, the components of the parking brake system, or both to create a braking force during a standard brake apply; a parking brake force during a parking brake apply; or both. The brake rotor may rotate with a wheel and axle of a vehicle when the vehicle is in motion. The brake rotor may include an inboard side and an opposing outboard side. To create the braking force, the parking brake force, or both, the friction material of the one or more brake pads may be moved or pushed against at least one of the sides of the brake rotor. After the one or more brake pads are moved or pushed against the brake rotor, the brake rotor may be restricted from rotating, and, accordingly, the vehicle may be slowed, stopped, and/or restricted from moving. After the friction material of the one or more brake pads is moved away from the brake rotor, the brake rotor and, accordingly, the vehicle can once again move.

The brake caliper may function to support one or more the components of the brake system, one or more the components of the parking brake system, or both. The brake caliper may be connected to a knuckle or a support structure of a vehicle. The brake caliper may support one or more brake pistons, one or more brake pads, and one or more actuator assemblies.

The one or more brake pistons may function to move a brake pad, or a corresponding end of brake pad, towards a side of the brake rotor to create the clamping force. During a parking brake apply, and/or during release of the parking brake apply, the brake piston may be moved by a corresponding actuator assembly. The brake piston may include a closed end selectively engaging the pressure plate of an inboard brake pad and an open end defining an opening into a piston pocket. The piston pocket may function to receive at least a portion of an actuator assembly. The piston pocket may be a cup or recess formed into one end of the brake piston.

The one or more brake pads may function to create the parking brake force. The one or more brake pads may include a pressure plate and a friction material. The pressure plate of the one or more inboard brake pads may be in communication with the one or more brake pistons, and the pressure plate of the one or more outboard brake pads may be in communication with one or more brake caliper fingers. During a parking brake apply, the actuator assembly may move one or more brake pistons, which may cause the one or more inboard brake pads, or ends of the one or more inboard brake pads to move against the brake rotor to create the parking brake force. The one or more caliper fingers may move the one or more outboard brake pads against the brake rotor to create the parking brake force.

The actuator assembly may function to move the one or more brake pistons, the one or more brake pads, or both towards the brake rotor to create the parking brake force. The actuator assembly may function to move the one or more brake pistons, the one or more brake pads, or both away from the brake rotor to release the parking brake force. In a disc brake system, the actuator assembly may comprise a motor gear unit (MGU), a spindle, and a nut. In a drum-in-hat brake system, the actuator assembly may include a motor, a spindle, a nut, and a brake cable.

The motor gear unit (MGU) may function to generate and/or transfer a force or torque that is suitable for creating and/or releasing the parking brake force. During application of the parking brake system, the MGU may function to generate a force or torque that is sufficient to move the one or more corresponding, spindle and nuts, the one or more brake pistons, the one or more brake pads, or a combination thereof towards the brake rotor. During release of the parking brake, the MGU may function to generate a force or torque that is sufficient to move the one or more corresponding spindle and nuts, the one or more brake pistons, or both away from the one or more brake pads so that the brake pads move away from the brake rotor. The MGU may be any device or combination of device that may function to perform one or more of the aforementioned functions. The MGU may include a motor. The motor may be any suitable motor. For example, the motor may be a DC motor, a series wound motor, a shunt wound motor, a compound wound motor, a separately exited motor, a servomotor, or a permanent magnet motor. The MGU may include or may be in communication with one or more gears or gear trains that may function to transfer, increase, and/or decrease an output force or torque generated by the motor. At least a portion of the MGU may be contained within at housing. The housing may be integrally formed with the brake caliper; removably attached to the brake caliper; permanently attached to the brake caliper; or attached in any suitable way to the vehicle. The one or more gears or gear trains may be located within the housing or located outside of the housing. The one or more gears or gear trains may be located intermediate an output shall of the motor or MGU and one or more spindles.

The distribution mechanism may be a mechanism that functions to distribute power or torque from the MGU, the motor, or both to the one or more spindles, actuator, or a combination thereof. The distribution mechanism may be a mechanism such as a differential that distributes power or torque from the MGU, the motor, or both to the one or more spindles, actuator, or a combination thereof. For example, the differential may distribute power equally to each of the pair of linear actuators until resistance of one of the pair of brake shoes increases then the differential assembly ceases to provide power to a brake shoe with increased resistance and distributes the power from the brake shoe with increased resistance to as brake shoe of lower resistance until a brake force is created as disclosed in commonly owned U.S. patent application Ser. Nos. 14/567,617 and 15/266,334 filed on Dec. 11, 2014 and Sep. 15, 2016, respectively, both of which are hereby incorporated by reference herein for all purposes. The distribution mechanism may be a mechanism such as those described in commonly owned. U.S. patent application Ser. No. 14/529,739 filed on Oct. 31, 2014, which is hereby incorporated by reference herein for all purposes. The distribution mechanism may be of the type disclosed in commonly owned U.S. patent application Ser. No. 14/940,297 filed on Nov. 13, 2015, which is directed towards sequentially supplying power from a source to multiple brake pistons, and is hereby incorporated by reference herein for all purposes. The distribution mechanism may be of the type disclosed in commonly owned U.S. patent application Ser. No. 14/676,346 filed on Apr. 1, 2015, which is hereby incorporated by reference herein for all purposes. The distribution mechanism may be of the type disclosed in commonly owned U.S. patent application Ser. No. 14/833,383 filed on Aug. 24, 2015, which is hereby incorporated by reference herein for all purposes. The distribution mechanism may be of the type disclosed in commonly owned U.S. patent application Ser. No. 15/192,461 filed on Jun. 24, 2016, which is hereby incorporated by reference herein for all purposes.

The one or more spindles may function to transfer torque from the motor, the MGU, one or more gears or gear trains, or a combination thereof into a linear force to move a corresponding nut, a corresponding brake piston, and/or a corresponding brake pad towards the brake rotor to create the parking brake force. The one or more spindles may function to transfer torque from the motor, the MGU, or both into a linear force to move a corresponding nut, a corresponding brake piston, and/or a corresponding brake pad away from the brake rotor to release the parking brake force. Each of the one or more spindles may have an input portion that is in communication with an output of the motor, the MGU, or both, and an output portion that is in communication with a corresponding nut. The input portion may receive motor torque from the motor, the MGU, or both, which may cause the spindle to rotate. The input portion may include any suitable connection for connecting with the motor, the MGU, or both. For example, the connection may include a threaded engagement, as friction engagement, an interference engagement, and/or the input portion may be coupled to the motor gear unit with one or more mechanical fasteners. Preferably, the connection is keyed (i.e., may include teeth, gears, notches, grooves, etc.). The output portion of the one or more spindles may include any suitable connection for connecting with the nut. Preferably, the output portion may engage a corresponding nut with a threaded engagement; however, a sliding engagement, an interference engagement, a permanent engagement, as removable engagement, a keyed engagement, or any other suitable engagement may be used.

Each of the one or more nuts may function to move a corresponding brake piston. That is, each of the one or more nuts may be in received in a piston pocket of a corresponding brake piston. The one or more nuts may transmit torque received from a corresponding spindle into a linear force to axially move the brake piston along a piston axis towards and/or away from a bottom surface of the piston pocket. In other words, rotation of a corresponding spindle may cause the corresponding nut to move axially along a nut axis. For example, during a parking brake apply, the spindle may rotate in a first or apply direction, which may cause the nut to move in a first or apply direction towards the bottom surface of the piston pocket. Further rotation of the spindle may cause the nut to engage the bottom surface of the piston pocket and then move the brake piston and the brake pad until the friction material of the brake pad eventually engages the brake rotor. During release of the parking brake apply, the spindle may rotate in a second or release direction, which may cause the nut to move in a second or release direction away from the bottom surface of the piston pocket so that the brake piston and the brake pad can move away from and disengage the brake rotor.

The spindle and nut may be self-locking, meaning the spindle and nut can sustain the parking brake force once created. Self-locking may mean the spindle and nut do not back drive unless a sufficient opposing force or torque is applied to the spindle, nut or both, that overcomes the coefficient of friction of the spindle and nut. Self-locking may mean that the spindle and the nut are a low efficiency device. Due to the self-locking effect between the spindle and the nut, there may be stiction (i.e., friction that prevents the spindle and nut from being set in motion) within the actuator assembly when transitioning from static to dynamic states. Accordingly, because position, force, or estimation is only valid during non-zero motor speed, the stiction of the actuator assembly may be ignored, and the dominant friction can be considered dynamic.

The spindle and the nut may be a high efficiency device or a non-locking device. A high efficiency device may convert a thrust force or load into a rotational force or torque and, as such, may back drive. Accordingly, the high efficiency device may require a mechanical brake or lock assembly to prevent back driving and sustain the linear output force. That is, the high efficiency device may require a mechanical brake or lock to maintain the clamping force of the parking brake assembly. In other words, because the coefficient of friction is generally low in a high efficiency device, back driving may occur when a reaction force applied onto the spindle, the nut, or both, is greater than the static force or coefficient of friction of the device. This may undesirably cause the spindle, nut, or both to move or rotate in an opposing direction. Without a mechanical brake or lock to prevent back driving, the high efficiency devices may undesirably, and prematurely, release the clamping force after it is created and the MGU is turned OFF. The mechanical brake to prevent such back driving may be located inside or within the motor, within the gear train, in the MGU, or anywhere in the brake system or the parking brake system.

A high efficiency device may be, for example to ball screw, a roller screw, s ball ramp, or a combination thereof. Ball screws may use ball bearings as the load transfer elements between the nut and spindle or screw. During movement of the ball screw, the ball bearings may circulate along races or grooves between the spindle and the nut. A roller screw is similar to a ball screw except that roller screws use rollers as the load transfer elements between nut and screw. The load on a ball screw, the roller screw, or both is distributed over a large number of ball bearings or rollers, via roller threads, respectively, so that each ball bearing or roller, when subjected to force, may roll and therefore, friction is reduced, which may equate to high efficiency. Accordingly, less force or torque may be required to move a spindle and nut in a ball screw or roller screw in an apply direction, a release direction, or both. A ball ramp may include a rotating side and a stationary side with rolling elements interposed there between. A torque input causes the rotating side to rotate, which also causes the rolling elements to engage and roll along the ramps between the rotating side and the stationary side. The ramps include a deep end and a shallow end. When the rotating side is rotated such that the rolling elements move or roll to the shallow side of the ramp, the rolling elements provide an axial force against the stationary side, thus axially moving the stationary side.

The spindle and/or nut may be of the type disclosed in commonly owned U.S. patent application Ser. No. 15/275,791 filed on Sep. 26, 2016, which is hereby incorporated, by reference herein for all purposes. The spindle and/or nut may be of the type disclosed in commonly owned U.S. patent application Ser. No. 15/194,840 filed on Jun. 28, 2016, which is hereby incorporated by reference herein for all purposes. The spindle and/or nut may be of the type disclosed in commonly owned U.S. patent application Ser. No. 15/274,270 filed on Sep. 23, 2016, which is hereby incorporated by reference herein for all purposes.

To create the parking brake force in a disc brake system, the parking brake system may be activated. Activation may occur by, for example, pushing a button, pulling a cable or lever, putting the vehicle in a parking position (i.e., automatically activated), etc. Once activated, the MGU, the motor, or both may create or generate a motor torque, which may cause the one or more spindles to rotate in a first or apply direction. Rotation of one or more of the spindles in the first or apply direction may cause the corresponding nuts to axially move in the first or apply direction towards the bottom of the corresponding piston pockets. Further rotation of the one or more spindles in the first or apply direction may cause the one or more brake pistons to move the one or more brake pads, or an end of the brake pads towards the inboard surface of the brake rotor to create the parking brake force.

To release the parking brake force in a disc brake system, the parking brake system may be activated. Activation may occur by, for example, pushing a button, pulling a cable or lever, putting the vehicle in a drive gear (i.e., automatically activated), etc. Once activated, the MGU, the motor, or both may create a rotational force or motor torque, which may cause the one or more spindles to rotate in a second or release direction. Rotation of one or more of the spindles in the second or release direction may cause the corresponding nuts to axially move in the second or release direction away from the bottom of the corresponding piston pockets. Further rotation of the one or more spindles in the second or release direction may cause the one or more brake pistons and therefore the one or more brake pads to move away from the inboard surface of the brake rotor and release the parking brake force.

The drum-in-hat brake system may include a drum brake, and a backing plate supporting one or more brake shoes and the parking brake system, which may include a motor and an actuator assembly.

The brake drum may cooperate with the components of the drum-in-hat brake system, the components of the parking brake system, or both to create a braking force during a brake apply, a parking brake force during a parking brake apply, or both. The brake drum may rotate with a wheel and axle of a vehicle when the vehicle is in motion. After the one or more brake shoes are pushed radially outward and engage an inner surface of the brake, the brake drum may be restricted from rotating, and, accordingly, the vehicle may be slowed, stopped, and/or restricted from moving. After the one or more brake shoes are moved away from the brake drum, the brake drum, and, accordingly, the vehicle can once again move.

The one or more brake shoes may function to create the parking, brake force. The one or more brake pads may include a pressure plate and a friction material. The pressure plate of the one or more brake shoes may be in communication with the one or more expanding, mechanisms. During a parking brake apply, an actuator assembly may move the one or more expanding mechanisms, which may cause the one or more brake shoes, or ends of the one or more brake shoes to move radially outward against the inner surface of the brake drum to create the parking brake force.

The actuator assembly may fraction to move one or more brake shoes towards or away from the inner surface of the brake drum. That is, during a parking brake apply, the actuator assembly may move the one or more expanding mechanism, which may cause the brake shoes to move radially outward and against the brake drum to create the parking brake force. During release of the parking brake, the actuator assembly may move the one or more expanding mechanisms, which may cause the brake shoes to move away from, and out of engagement with the brake rotor and release the parking brake force. The actuator assembly may be contained within a housing and may generally include therein a motor, a spindle, and a nut. The housing may include a boot protecting at least a portion of the brake cable and the spindle. The boot may be made of a generally flexible material.

The actuator may be of the type disclose in commonly owned U.S. patent application Ser. No. 14/750,488 filed on Jun. 25, 2015, which is hereby incorporated by reference herein for all purposes. The actuator may be of the type disclose in commonly owned U.S. patent application Ser. No. 15/248,134 filed on Aug. 26, 2016, which is hereby incorporated by reference herein for all purposes.

The spindle may function to move the brake cable to create and/or release the parking brake force. The spindle may function to assist in transferring a rotational force or motor torque from the motor into a linear force to move the brake cable in a first or apply direction, a second or release direction, or both. The spindle may function to push or pull one or more cable stops to move the brake cable in a first or apply direction, a second or release direction, or both. The spindle may be any device that may perform one or more of the aforementioned functions.

The nut may function to axially and/or linearly move the spindle and, therefore, the brake cable to create and/or release the parking brake force. The nut may function to assist in transferring a rotational force or motor torque from the motor into a linear force so that the spindle and the brake cable move axially and/or linearly. The nut may be connected to the spindle. The nut may threadably engage the spindle so that rotation of the nut gear in a first or apply direction causes the spindle to move axially in a first or apply, and rotation of the nut in a second or release causes the spindle to move axially in a second or release direction. The nut may be connected to the motor. That is, the nut may include one or more features for receiving a rotational force or motor torque from the motor. For example, the nut may include teeth engaging the motor or one or more output gears in communication with the motor. The nut may be restricted from axially, linearly, or both moving while the spindle axially moves. That is, the nut may be axially secured to the housing, the housing plate, or both.

The spring may function to reduce an overall stiffness of the system. The spring may be any spring. Preferably, the spring is a compression spring. The compression spring may add "compliance" to the system. The spring may function to maintain a cable tension load as the parking brake deflects when subjected to the parking load (torque), which may happen after the motor has stopped. The spring may be compressed during application of the parking brake, release of the parking brake, or both. Preferably, the spring is compressed during both the application and release of the parking brake. Preferably, the spring is pre-loaded (i.e., at least partially compressed) in a steady state or free running configuration when the parking brake system is neither being applied nor released.

The brake cable may function to move the one or more brake shoes to create or release the parking brake force. The brake cable may be moved when the spindle is moved by the nut and motor. The brake cable may be pulled, which, via a connecting portion, may move a expanding mechanism or parking brake lever in communication with one or more brake shoes so that the one or more brake shoes engage the inner surface of the brake drum to create the parking brake force. Once the parking brake force is established, the brake cable may be in tension. Accordingly, moving the spindle in the second or release direction may reduce the tension in the brake cable, thereby allowing the expanding mechanism to move so that the one or more brake shoes can disengage the inner surface of the brake drum and release the parking brake force. The brake cable may include a connecting portion for engaging the parking brake lever, one or more brake shoes, the like, or a combination thereof. The connecting portion may be any feature that may engage the parking brake lever, one or more brake shoes, the like, or a combination, thereof. For example, the connecting portion may be as joint jaw, a hook, a cable crimp, etc.

The parking brake system in a disc brake system, drum-in-hat brake system, or both may have control logic for accurately estimating and determining a position of the actuator assembly (e.g., the spindle and the nut), a position of the brake piston, a position of the motor, current draw by the motor, motor speed, an amount of parking brake force or clamping force, or a combination thereof. The control logic may be embedded in a control module. The control module may be an electronic control unit, a stability control unit, or the like. The control module, the control logic, or both may include a linear time variant observer (LTV) for estimating a position of the actuator assembly, a position of the brake piston, a position of the motor, or a combination thereof. The caliper dynamics considered for estimation of position and/or force may be non-linear. The non-linear caliper dynamics may be linearized about a particular operating state (e.g., a parking brake apply or a parking brake release) based on the estimated parking brake force through feedback linearization. The linearized operating state may provide an indication of motor load during both the parking brake apply and parking brake release operations.

The control module, the control logic, the LTV, or a combination thereof may be used to estimate a position of the motor, a position of the spindle, a position of the nut, a position of the actuator assembly, the motor speed, current draw by the motor, or a combination thereof. The LTV may relate, correlate, and/or determine a current and a voltage measurement to an estimated position of the motor or rotational angle of the motor, motor velocity, current draw by the motor, or a combination thereof. A position of the actuator assembly, the brake piston, or both can be accurately estimated based on the estimated position of the motor, which is the rotational position or angle of the motor. This is because when the output shaft of the motor is rotated, the actuator assembly and thus the brake piston or brake shoe correspondingly move because they are all rigidly connected via one or more geared and/or threaded connections. The displacement or movement of the actuator assembly, the brake piston, or both may be related to the clamp force, which may also be referred to herein as the parking brake force.

During a parking brake apply in a disc brake system, as the nut axially moves towards the bottom of the piston pocket, and the brake pads are moved towards the braking surface or the brake rotor, the parking brake force can be related to the motor position based on a suitable regression model. For example, the model may be a $1^{st}$ order linear regression model, a $2^{nd}$ order polynomial regression, a $3^{rd}$ order regression model, a $4^{th}$ order regression, etc. For example, the parking, brake force can be related to the motor position based on known system stiffness often modeled through use of a $2^{nd}$ order polynomial regression. During a parking brake apply in a drum-in-hat brake system that has an internal compliance spring, the parking brake force can be related to the motor position based on a regression model such as a piecewise representation or a lookup table. In either case, a known system stiffness should be defined and analytically represented for relating position of the motor, actuator, and/or brake piston to clamping force or parking brake force.

One or more models or subcomponents may define the LTV. The one or more subcomponents may include a harness subcomponent, a state estimation subcomponent, a force estimation subcomponent, and a feedback linearization subcomponent. It is understood that one or more of the aforementioned subcomponents can be combined and/or cascaded. That is, for example, the force estimation subcomponent can be cascaded into the state estimation subcomponent and defined as a single subcomponent.

Figure 5:
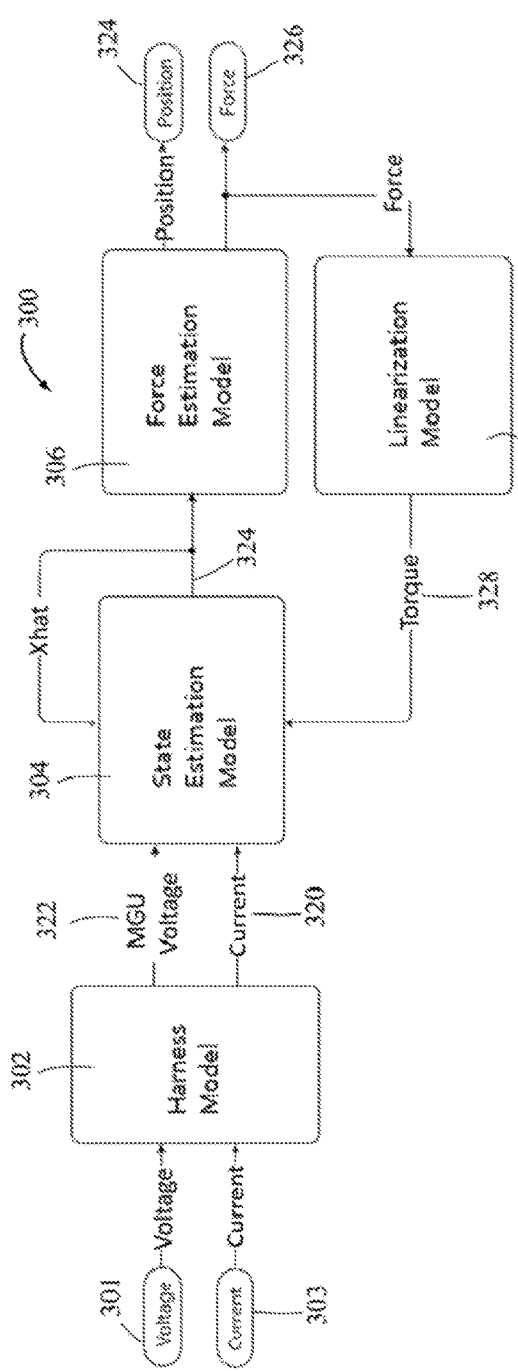
FIG. 5 is a flow diagram or control model of the linear time variant estimation (LTV).

FIG. 1 is a perspective, cross-sectional view of a brake system 100 that is a disc brake system. The brake assembly 100 includes a brake caliper 102 supporting an inner and an outer brake pad 104, 106, a brake piston 108, and a parking brake system 110 including an actuator assembly 112. The brake pads 104, 106 include a friction material 114 and a pressure plate 116. The actuator assembly 112 includes a spindle 118, a nut 120, and an MGU 122 having a motor 124. A brake rotor (not illustrated) is located between the friction material 114 of both brake pads 106, 108. A control module 126 is in communication with the brake system 100, the parking brake system 110, or both. The control module 126 includes the control logic or the LTV 300 (FIG. 5).

To create parking brake force, the motor 124 generates torque that causes the spindle 118 to rotate in an apply direction. A gear train may be located between the motor 124 and the spindle 118 so that the torque generated by the motor 124 is increased or decreased before the torque is communicated to the spindle 118. Rotation of the spindle 118 in the apply direction causes the nut 120 to move axially in an apply direction towards a bottom surface of a piston pocket 128 in the brake piston 108. After the nut 120 engages the bottom surface of the piston pocket 128, further rotation of the spindle 118 causes the nut 120 to axially move the brake piston 108 and thus the brake pad 104 against the brake rotor. At the same time, one or more brake caliper fingers may pull the outboard brake pad 106 towards and against an opposing side of the brake rotor until a sufficient parking brake force is established.

To release the parking brake force, the motor 124 generates torque that causes the spindle 118 to rotate in a release direction. A gear train may be located between the motor 124 and the spindle 118 so that the torque generated by the motor 124 can be increased or decreased before the torque is communicated to the spindle 118. Rotational of the spindle 118 in the release direction causes the nut 120 to move axially in a release direction away from the bottom surface of the brake piston 108 thereby allowing the brake pads 106, 108 to move away from the brake rotor.

While creating and releasing the parking brake force, the control module 126 or the LTV 300 may estimate the position of the spindle 118, the nut 120, the brake piston 108, the motor 124, or a combination thereof. The control module 126, the control logic or the LTV 300 relates the displacement or position of the spindle 118, the nut 120, the brake piston 108, the motor 124, or a combination thereof to the parking brake force.

Over time as the friction material 114 of the brake pads 104, 106 wears, the position of the spindle 118, the nut 120, the brake piston 108, the motor 124, or a combination thereof changes. That is, as the friction material 114 wears, the spindle 118, the nut 120, the brake piston 108, the motor 124, or a combination thereof must move to a new position to create an adequate clamping force or parking brake force. The LVT 300 estimates and then relates the position of the spindle 118, the nut 120, the brake piston 108, the motor 124, or a combination thereof to the clamping force, parking brake force so that changes in the positions can be compensated and incorporated into the next parking brake apply, for example.

Figure 2:
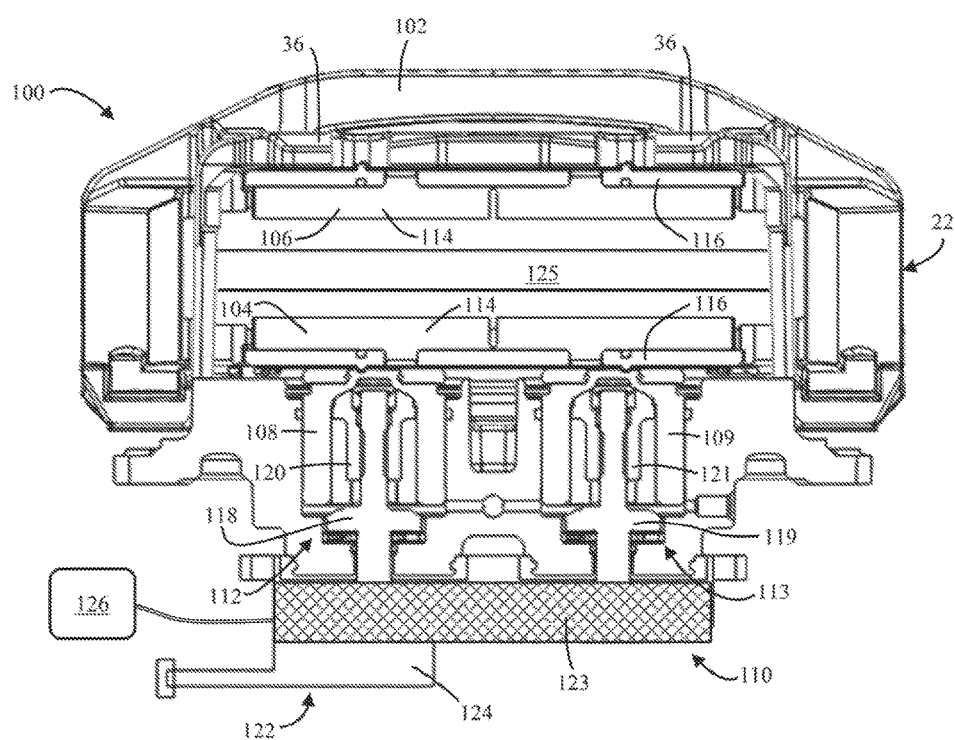
FIG. 2 is a cross-sectional view of a 2-piston disc brake system including a motor on caliper parking brake system.

FIG. 2 is a cross-sectional view of a brake system 100 that is a two-piston disc brake system. The brake assembly 100 includes a brake caliper 102 supporting an inner and an outer brake pad 104, 106, a first and a second brake piston 108, 109, and a parking brake system 110. Each of the brake pads 104, 106 include a friction material 114 and a pressure plate 116. The parking brake system 110 includes a first actuator assembly 112 in communication with the first brake piston 108 and a second actuator assembly 113 in communication with the second brake piston 109. The first actuator assembly 112 includes a spindle 148 and a nut 120. The second actuator assembly 113 includes a spindle 119 and a nut 121. Both of the spindles 118, 119 are in communication with a distribution mechanism 123. The distribution mechanism 123 distributes torque from the MGU 122 and/or motor 124 to one or both of the spindles 118 and 119. A brake rotor 125 is located between the friction material 114 of both brake pads 106, 108. A control module 126 is in communication with the brake system 100, the parking brake system 110, or both. The control module 126 includes the LTV 300 (FIG. 5).

Figure 3:
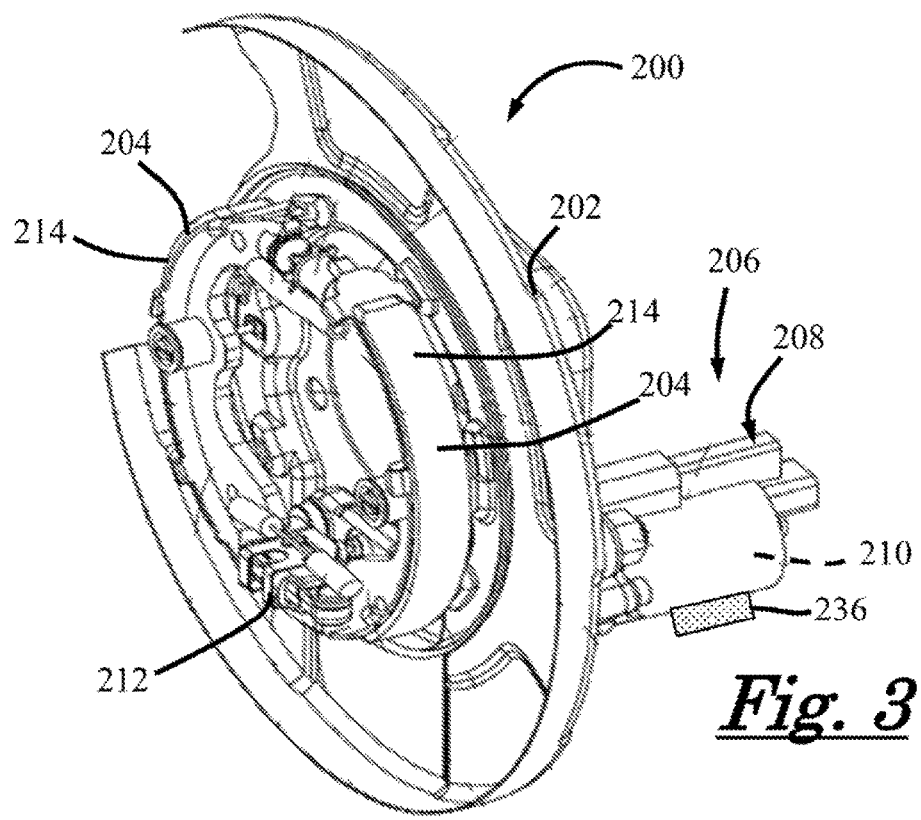
FIG. 3 is a perspective view of a brake system including an electric drum in hat parking brake system.
Figure 4:
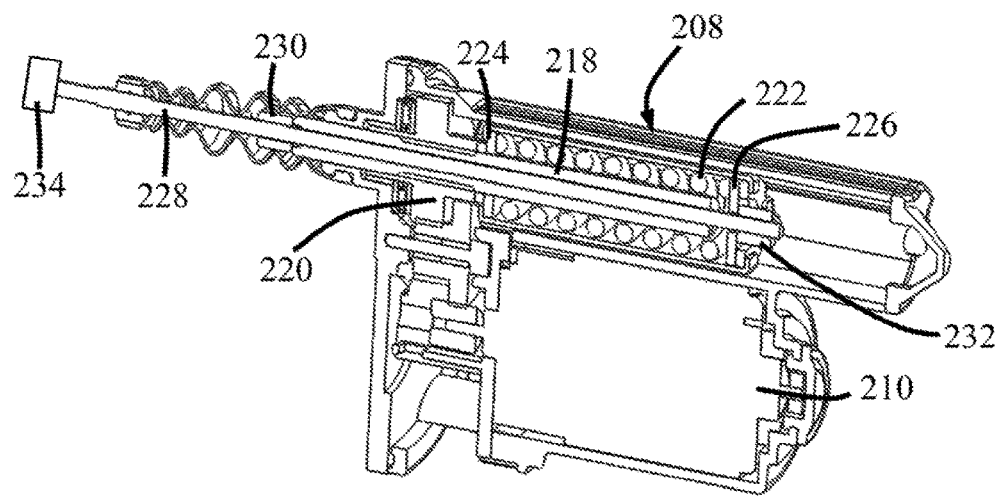
FIG. 4 is a perspective cross-sectional view of the actuator assembly for use with the electric drum in hat parking brake system of FIG. 3.

FIG. 3 is a perspective, cross-sectional view of a brake assembly 200 that is a drum-in-hat brake system. The brake assembly 200 includes a backing plate 202 supporting a pair of brake shoes 204 and a parking brake system 206 having an actuator assembly 208. The actuator assembly 208 includes a motor 210. An expanding mechanism 212 is located between the brake shoes 204. The brake shoes 204 include a friction material 214. The expanding mechanism 212 is in communication with a connecting, portion 234 of the actuator assembly 208 (FIG. 4). A control module 236 is in communication with the brake system 200, the parking brake system 206, or both. The control module 236 includes the control logic, the LTV 300 (FIG. 5), or both.

FIG. 4 is a cross sectional view of the actuator assembly 208. The actuator assembly 206 includes a spindle 218 engaging a nut 220. The nut 220 is in rotational communication with an output of the motor 210. Rotation of the nut 220 in an apply direction causes the spindle 218 to move axially in an apply direction, and rotation of the nut 220 in a release direction causes the spindle 218 to move axially in a release direction. A spring 222 is located between a key plate 224 and an end plate 226. The spindle 218 is generally hollow so that a brake cable 228 can pass there through. The brake cable 228 includes a first and second cable stop 230, 232 and a connecting portion 234 connecting the brake cable 228 to the expanding mechanism 210 (FIG. 3). The connecting portion 234 may be a joint jaw.

To create parking brake force, the motor 210 generates a motor torque that causes the nut 220 to rotate in an apply direction. Rotation of the nut 220 in the apply direction causes the spindle 218 to move in an apply direction. When the spindle 218 moves in the apply direction 132, an end of the spindle 218 engages the end plate 226 and moves the end plate 226 against the second brake cable stop 232 so that the brake cable 228 moves in the apply direction. While the spindle 218 moves in the apply direction, the key plate 224 moves or pushes the spring 222 against the end plate 226. Accordingly, the spring 222 and the end plate 226 are together moved against the second cable stop 232 so that the second cable stop 232 moves in the apply direction causing the brake cable 228 to move in the apply direction. Accordingly, the brake cable 228 pulls the expanding mechanism 212 causing one or both of the brake shoes 204 to move and engage an inner surface of a brake drum to create the parking brake force. Moreover, movement of the spindle 218 in the apply direction causes the key plate 224 to compress the spring 222 against the end plate 226, which may result resulting in an increase in current draw from the motor 210.

To release parking brake force, the motor 210 generates a motor torque that causes the nut 220 to rotate in a release direction. Rotation of the nut 220 in the release direction causes the spindle 218 to move in a release direction causing an end of the spindle 218 to push the first cable stop 230 in the release direction thereby moving the expanding mechanism 210. Accordingly, one or both of the brake shoes 204 move and disengage the inner surface of a brake drum and release the parking brake force. Due to the key plate 224 being moved and abutted against the nut 220, movement of the spindle 218 in the release direction 134 causes the second cable stop 232 to move or push the end plate 226 against the spring 222. Accordingly, the end plate 226 and the spring 222 are moved or pushed against the key plate 224 abutted against the nut 220 thereby compressing the spring 222 there between. Compression of the spring 222 results in an increase in current draw from the motor 210.

While creating and/or releasing the parking brake force, the control module 236 or LTV 300 may estimate the position of the motor 210, the spindle 218, the nut 220, the expanding mechanism 212, or a combination thereof. The position of the motor 210, the spindle 218, the nut 220, the expanding mechanism 212, or a combination thereof may be related because they are rigidly connected. The LTV may also estimate the motor speed or velocity and/or the motor current. The motor current as used throughout may be understood as the amount of current drawn by the motor from a power source when the parking brake system is actuated to create and/or release the parking brake. The control module 226 or the LTV 300 may relate the displacement or position of the motor, the spindle 218, the nut 220, the expanding mechanism 212, or a combination thereof to the clamping force or the parking brake force.

FIG. 5 illustrates a flow diagram or control model of the linear time variant (LTV) 300 that is contained within the control module 126, 226. As was discussed above, because a position sensor is not used in this parking brake system to determine a position of the motor, the actuator assembly, and/or the brake piston, the LTV 300 is used to accurately estimate motor position, actuator position, spindle position, nut position, or a combination thereof. The LTV 300 is also used to accurately estimate motor speed or velocity and motor current. The control logic architecture of the LTV 300 comprises various models, that, as was also discussed above, can be combined or cascaded. The models of the LTV 300 include a harness model 302, a state estimation model 304, a force estimation model 306, and a linearization model 308.

The harness model 302 may be a model of the vehicle harness from the control module 126, 226 to the actuator assembly 112, 113, or 208. Current and voltage of the motor 124 is measured at the harness model 302. Before the parking brake system is actuated, the load on the motor 124 is known to be zero. Accordingly, an input voltage 301 and input current 303 to the motor 124 is known. After the parking brake system is actuated and load on the motor 124 increases in order to create or release the parking brake, the motor 124 draws additional current (i.e., motor current) from a source to keep the motor 124 running in order to actuate and move the MGU 122, the actuator assembly 112, 113, 208, the brake pads 104, 106 or brake shoes 204, etc. to create the clamping force. As the current draw by the motor 124 increases, the voltage at the motor terminals drops due to the harness resistance. This change in current is measured at the harness model 302. A resistance of the harness is taken into consideration in these measurements, and the motor voltage is determined based on the measured current and measured voltage at the harness model. A motor current measurement 320 and a motor voltage measurement 322 of the motor 124 is output from the harness model 302 and input into the state estimation model 304.

The system dynamics 304 is a model used to estimate motor position, motor velocity, and/or motor current. The state estimation model 304 may be a linearized, state space model of the actuator assembly. The motor position, motor velocity, and/or motor current is estimated based on the current and voltage measurements 320, 322 from the harness model 302. One or more of the motor position, motor velocity, and motor current are contained in xhat, which is an output of the model 324. The estimated motor position 324 (contained within xhat) is output from the state estimation model 304 and inputted into the force estimation model 306. As shown and discussed at FIG. 6, the state estimation model 304 takes into consideration motor dynamics 310 and MGU dynamics 312. The estimated states (e.g., motor position, motor velocity and/or motor current; xhat) 324 is output from the state estimation model 304 and fed back into the state estimation model 304 to provide an error correction term based on estimated and measured current, as will be discussed further below.

Figure 8:
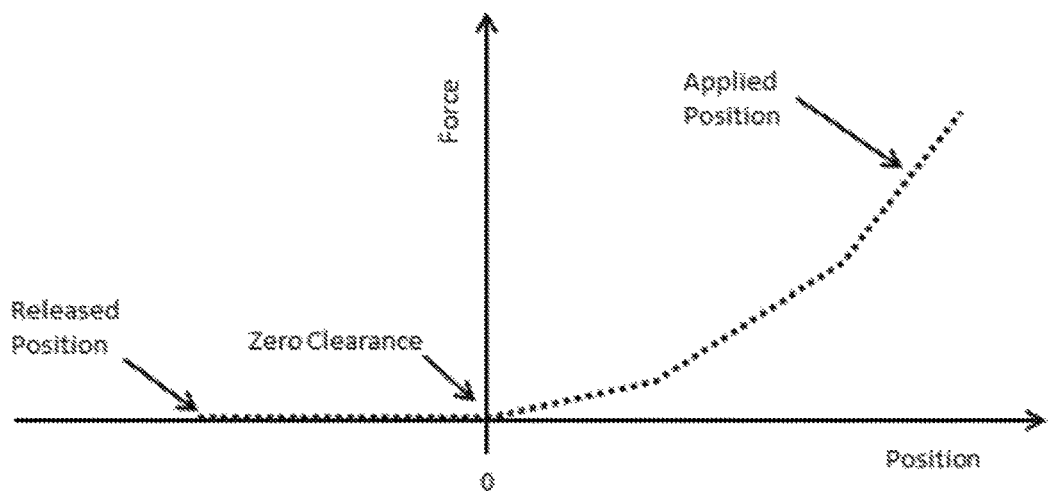
FIG. 8 is a graph illustrating changes in the position of the motor, the brake pads or shoes, the actuator, or a combination thereof as a function of the parking brake force.

The force estimation model 306 is a model used to estimate clamp force 326, which is used herein interchangeably with the parking brake force. The force estimation model 306 may provide a force model that can be implemented as a polynomial regression, or a lookup table for estimating the clamping force. In the force estimation model 306, clamp force is estimated based on the estimated motor position 324. However, the clamp force can be estimated based also, or instead, on the estimated motor current and/or estimated motor speed. The estimated clamp force 326 may be a $2^{nd}$ order polynomial regression of the estimated motor position 324. Estimated motor position 324 and estimated clamp force 326 is output from the force estimation model 306. During the parking brake apply, the clamp force is the amount of force created when the brake pads or brake shoes are pressed against a braking surface (e.g., brake rotor or brake drum, respectively) to create the parking brake force to restrict or prevent movement of a wheel or vehicle. Of course, during release of the parking brake, the clamp force is reduced so that the wheel or vehicle can once again move. One skilled in the art understands that over time the friction material of the brake pads and brake shoes wear, thus requiring the brake pads and shoes to be moved further towards a braking surface to create sufficient damp force or parking brake force. Accordingly, to compensate for this additional required movement of not only the brake pads and shoes but also the actuator assemblies, the motor position changes to create the required clamp force. Thus, the LTV 300 continuously updates to compensate for this wear and the corresponding changes in the position of the motor and/or actuator. These updates are accomplished at the force estimation model 306, which is centered at a zero clearance condition when the brake pads or brake shoes begin to engage the rotor or drum, respectively. This is shown in FIG. 8, where a position of the motor, the brake pads or shoes, the actuator, or a combination thereof changes as wear of the brake pads or brake shoes increases.

The clamp force output 326 from the force estimation model 306 is input into the linearization model 308. The output of the linearization model 308 is an estimate of the motor load torque 328, which linearizes the state estimation model 304 (i.e., estimated motor position, motor velocity, motor current) using feedback linearization. The estimated motor load torque 328 is fed into the state estimation model 304 along with the estimated states 324 (i.e., xhat; estimated motor position, estimated motor velocity; estimated current draw by the motor, or a combination thereof) that is output from the state estimation model 304. By using motor load torque 328 feedback into the estimation model 304, the system is represented in state space representation where the state A matrix as defined in equations 20 and 22 is a time variant matrix (ie, A(t)). Feedback linearization about the motor operating load 328 provides the correct linear state space formation for estimation of the internal states (xhat) using equations 36 through 39.

Figure 6:
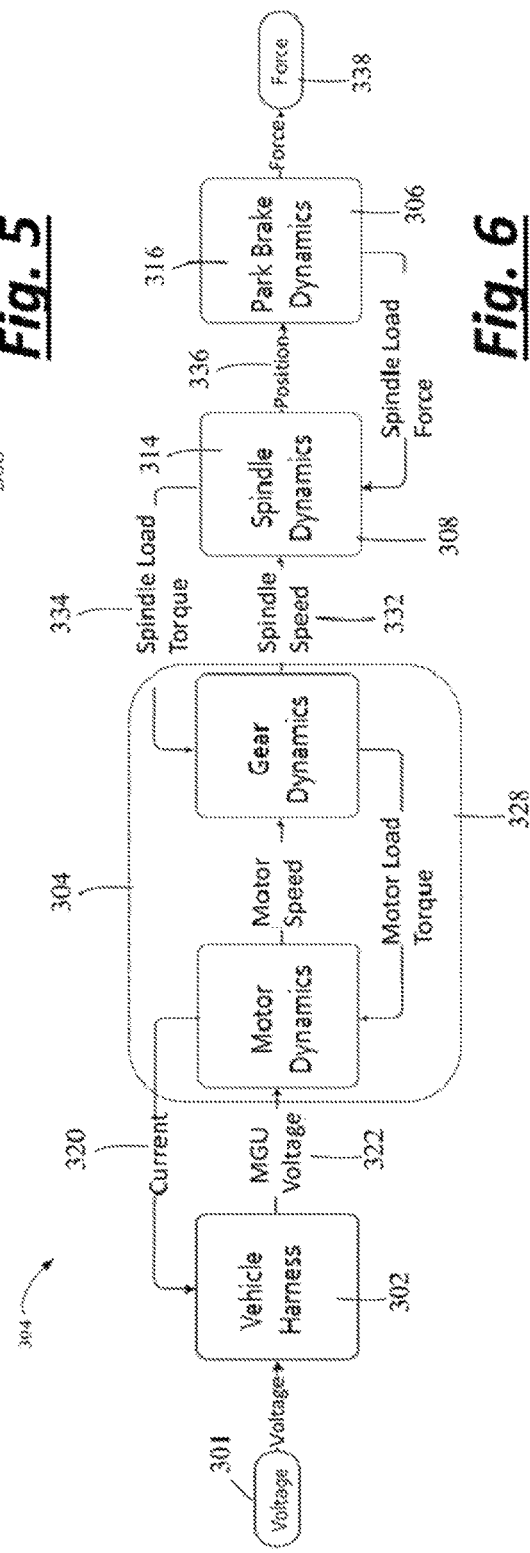
FIG. 6 is a flow diagram of the subcomponents of the state estimation model of the LTV of FIG. 5.

FIG. 6 illustrates the LTV 300 defined by a parametric system model. The parametric system model can be described by a motor dynamics subcomponent 310, an MGU dynamics subcomponent 312, an actuator assembly dynamics subcomponent 314, and a brake caliper dynamics subcomponent 315. One or more models or subcomponents may define the LTV.

During the parking brake apply, or release of the parking brake, as the motor 124 is loaded, the motor 124 draws additional current, which, as was discussed above, is an output measurement 322 from the harness model 302. Motor speed 330 and motor current 320 are estimated as outputs from the motor dynamics model 310. Motor speed 330 and motor current 320 are estimated based on the voltage measurement output 322 and motor load torque 328. The motor speed 330 and correspondingly spindle position 336 is used to determine a motor load torque 328, which is fed back into the motor dynamics model 310 so that the LTV 300 can continuously update the motor position 324. Spindle speed 332 is based on the motor speed 330, and is output from the gear dynamics model 312 and input into the spindle dynamics model 314 to determine a spindle torque 334 based on the load force feedback from the park brake dynamics 316. A position 336 of the spindle is related to the spindle speed 332. The spindle position 336 is output from the spindle dynamics model 314, and input into the park brake dynamics 316. The spindle force 338 is output from the park brake dynamics 338 and also fed back into the spindle dynamics model 314 so that the LTV 300 can continuously update the spindle position 336 to spindle force 338 as the brake pads or brake shoes wear over time. The spindle load force 338 is related to the clamp force 326 discussed in FIG. 5.

The motor dynamics subcomponent 310 may be modeled using Kirchoff's Voltage Law, Torque balance equations, and/or Ohm's Law. The input voltage 301 to the motor 124 may be derived, from an observed electronic control current and voltage using a nominal vehicle harness resistance. The generated motor torque ($K_t i$) and back electromotive force (EMF) voltage may be a function of the measured current 320, motor speed 330, and a motor constant. The motor terminal voltage may be estimated based on the harness resistance and current observation 320 based on Ohm's Law. The motor voltage (U) 322 may be equated as the measured ESC voltage ($V_{esc}$) minus the harness voltage drop ($iR_r$) as shown in EQ1.

$$U = V_{esc} - iR_r \qquad \text{EQ1:}$$

The rate of current change 320 in the parametric system model can be represented as the applied motor voltage (U), minus the back EMF voltage and resistance drop within the circuit, as shown in EQ2, where L represents the circuit inductance, R the circuit resistance, and Kb the motors back EMF constant.

$$\frac{dI}{dt} = -\frac{iR}{L} - \frac{K_b \theta}{L} + \frac{1}{L}U \qquad \text{EQ2}$$

Within the torque balance equations, the inertia (J) may consist of a motor component in addition to an equivalent reflected inertia from the actuator assembly, including the spindle and the nut. For high reduction systems, as is typical of motor on caliper systems, the equivalent downstream inertia can often be ignored due to equivalent inertia having the relationship of $1/R^2$. Motor acceleration may therefore be a function of the motor torque ($K_t i$), minus the motor load torque ($T_m$) 328 and viscous losses due to internal damping (v), as shown in EQ3.

$$\frac{d\theta}{dt} = -\frac{T_m}{J} - \frac{v\theta}{J} + \frac{K_t i}{J} \qquad \text{EQ3}$$

The MGU dynamics subcomponent 312 may be a model of the amplified motor torque ($T_m$) applied to the actuator assembly. The total amplification may be a function of the lumped reduction ratio ($R_t$) and gear efficiency ($\eta_t$). This relationship may be indicated by EQ 4, where spindle torque is represented by $T_s$.

$$T_m(t) = \frac{T_s(t)}{R_t \eta} \qquad \text{EQ4}$$

The actuator assembly dynamics subcomponent or spindle dynamics 314 may be a model of the spindle and nut. The parking brake force, F(t), may be related to the spindle torque ($T_s(t)$), based on one or more spindle and nut parameters. The relationship between the parking brake force F(t) and spindle torque ($T_s(t)$) may be dependent on the particular operating mode of the spindle (e.g., whether the spindle is being operating during a parking brake apply or release of the parking brake) and may be represented as a piecewise equation with respect to a motor and/or spindle velocity. Due to the self-locking effect between the spindle and the nut, there is considerable stiction (i.e., friction that prevents the spindle and nut from being set in motion) within the actuator assembly when transitioning from static to dynamic friction. Accordingly, because estimation only is only valid during non-zero motor speed, the actuator assembly stiction can be ignored and the dominant friction during operation can be considered dynamic.

The spindle torque equations for both a parking brake apply and release of the parking brake may be defined by equations EQ5 and EQ6, respectively. The spindle factor equations ($SF_{sa}$, $SF_{sr}$) can be expressed in one or more forms for symmetric and non-symmetric threads. For example, the spindle factors $SF_{sa}$, $SF_{sr}$ can be expressed by EQ7 and EQ8, respectively. The spindle parameters may include one or more parameters, such as spindle friction μ, effective spindle diameter dm, spindle lead 1, and spindle flank angle α. The bearing parameters may include bearing friction $\mu_{db}$ and effective bearing diameter $d_b$. The spindle and bearing parameters (SF) may be evaluated using adaptive control methods to address degradation of the parking brake system over time. Combining EQ5 and EQ7 and EQ6 and EQ8 yields EQ9 and EQ 10, respectively.

$$T_{sa}(t) = SF_{sa} F(t) \qquad \text{EQ5:}$$

$$T_{sr}(t) = SF_{sr} F(t) \qquad \text{EQ6:}$$

$$SF_{sa} = \frac{d_m}{2}\left[\frac{l + \pi\mu_{ds}d_m \sec\alpha}{\pi d_m - \mu_{sd} l \sec\alpha}\right] + \frac{\mu_{db} d_b}{2} \qquad \text{EQ7}$$

$$SF_{sr} = \frac{d_m}{2}\left[\frac{\pi\mu_{ds}d_m \sec\alpha - l}{\pi d_m + \mu_{sd} l \sec\alpha}\right] + \frac{\mu_{db} d_b}{2} \qquad \text{EQ8}$$

$$T_{sa}(t) = \frac{F(t)d_m}{2}\left[\frac{l + \pi\mu_{ds}d_m \sec\alpha}{\pi d_m - \mu_{sd} l \sec\alpha}\right] + \frac{F(t)\mu_{db} d_b}{2} \qquad \text{EQ9}$$

$$T_{sr}(t) = \frac{F(t)d_m}{2}\left[\frac{\pi\mu_{ds}d_m \sec\alpha - l}{\pi d_m + \mu_{sd} l \sec\alpha}\right] + \frac{F(t)\mu_{db} d_b}{2} \qquad \text{EQ10}$$

The caliper dynamics subcomponent or the park brake dynamics 316 and, correspondingly, the brake piston displacement can be related to the generated parking brake force (F(t)) based on system stiffness characteristics. The system stiffness characteristics can be represented by a suitable regression model, such as a $1^{st}$ order regression model, a $2^{nd}$ order regression, a $3^{rd}$ order, a $4^{th}$ order regression model, etc. For example, the system stiffness can be represented by the characteristic shown in EQ16 and EQ17 for the parking brake apply and release of the parking brake, respectively. In a disc brake system, the parking brake force (F(t)) can be implemented by two regression coefficients C1 & C2. These regression coefficients C1 & C2 can further be refined as a function of both temperature and wear to form a model of piston position to parking brake force (F(t)). The parking brake force (F(t)) can correspondingly be substituted within EQ9 and EQ10 to represent spindle torque ($T_s(t)$) as a function of piston position and spindle factor (SF).

$$F(t) = C1x(t)^2 + C2x(t) \qquad \text{EQ11:}$$

$$T_{sa}(t) = SF_{sa}[C1x(t)^2 + C2x(t)] \qquad \text{EQ12:}$$

$$T_{sr}(t) = SF_{sr}[C1x(t)^2 + C2x(t)] \qquad \text{EQ13:}$$

The caliper dynamics subcomponent or the park brake dynamics 316 can be represented using state space notation. The overall efficiency of the parking brake system can be lumped into a single representation for use in adaptive control. This single representation may consist of one or more parameters, such as motor, MGU, bearing, and spindle efficiency parameters. The lumped spindle factor is described below in EQ14 and EQ15 for the parking brake apply and release of the parking brake, respectively. The motor load torque ($T_m$) 328 representation is described in EQ16 and EQ17 after substituting EQ14 and EQ15 into the motor load torque equation EQ4 and the spindle torque equations EQ9, EQ10, respectively.

$$SF'_{sa} = \frac{SF_{sa}}{R_t \eta} \qquad \text{EQ14}$$

$$SF'_{sr} = \frac{SF_{sr}}{R_t \eta} \qquad \text{EQ15}$$

$$T_{ma}(t) = \frac{T_{sa}(t)}{R_t \eta} = \frac{SF_{sa}[C1x(t)^2 + C2x(t)]}{R_t \eta} = SF'_{sa} F(t) \qquad \text{EQ16}$$

$$T_{mr}(t) = \frac{T_{sr}(t)}{R_t \eta} = \frac{SF_{sr}[C1x(t)^2 + C2x(t)]}{R_t \eta} = SF'_{sr} F(t) \qquad \text{EQ17}$$

The parking brake system can be represented in non-linear formation. The internal chosen states of the system can be motor position ($\theta$), motor velocity ($\dot{\theta}$), and motor current (i) System observations are described by the state output (y), and are given for only motor current (i). This motor current observation (i) is made by the control unit, electronic stability controller, or equivalent vehicle hardware. The LTV 300 may rely on knowledge of the input voltage (U) 301 and motor current (i) 320 observations to correct its state estimations (predictor corrector).

$$\frac{d}{dt}\begin{bmatrix} \theta \\ \dot{\theta} \\ i \end{bmatrix} = \begin{bmatrix} \dot{\theta} \\ -\frac{SF'_{si}F(x)}{J} - \frac{v\dot{\theta}}{J} + \frac{K_t i}{J} \\ -\frac{iR}{L} - \frac{K_b \dot{\theta}}{L} \end{bmatrix} + \begin{bmatrix} 0 \\ 0 \\ \frac{1}{L} \end{bmatrix} U \qquad \text{EQ18}$$

$$y = \begin{bmatrix} 0 & 0 & 1 \end{bmatrix} \begin{bmatrix} \theta \\ \dot{\theta} \\ i \end{bmatrix} \qquad \text{EQ19}$$

The motor load torque ($T_m$) 328 represented in equations EQ16 and EQ17 can be evaluated as a time varying parameter to linearize the state space representation in EQ18 about the current operating motor load. The linearization may be completed through feedback to the state estimation model 304 in order to update the model 304 in discrete time. The linearized state space formation is shown in equations EQ20-EQ23. This feedback linearization allows for the use of the linear time variant estimation of motor position ($\theta$), motor velocity ($\dot{\theta}$), and motor current (i). This feedback linearization is represented by Fx(t) in EQ22 below.

$$\dot{x}(t) = A(t)x(t) + Bu(t) \qquad \text{EQ20:}$$

$$y(t) = Cx(t) + Du(t) \qquad \text{EQ21:}$$

$$\frac{d}{dt}\begin{bmatrix} \theta \\ \dot{\theta} \\ i \end{bmatrix} = \begin{bmatrix} 0 & 1 & 0 \\ -\frac{SF'_{si}F_x(t)}{J\theta} & -\frac{v}{J} & \frac{K_t}{J} \\ 0 & -\frac{K_b}{L} & -\frac{R}{L} \end{bmatrix} \begin{bmatrix} \theta \\ \dot{\theta} \\ i \end{bmatrix} + \begin{bmatrix} 0 \\ 0 \\ \frac{1}{L} \end{bmatrix} U \qquad \text{EQ22}$$

$$y = \begin{bmatrix} 0 & 0 & 1 \end{bmatrix} \begin{bmatrix} \theta \\ \dot{\theta} \\ i \end{bmatrix} \qquad \text{EQ23}$$

Observability (Ob) may refer to a how well the internal states of the system (i.e., motor position ($\theta$), motor velocity ($\dot{\theta}$), and motor current (i)) can be inferred by knowledge of its external outputs. A system may be observable if for any possible sequence of state and control vectors, the current state can be determined in finite time using only the outputs. This quality may be evaluated by checking the rank of the observability matrix of equations EQ34 and EQ35. All of the parameters within the observability matrix of EQ35 may be constant time invariant parameters except for the generated parking brake force ($F_x(t)$). The generated parking brake force ($F_x(t)$) may be a time variant parameter. The generated parking brake force ($F_x(t)$) can take on either a positive, real representation of the parking brake force, or a value of zero. In the case of generation or the parking brake force, the observation matrix may be of full rank, which may correspond to complete observability. Complete observability may mean that all internal system states can be estimated based on the motor current (i) observation.

During a parking brake apply, the parking brake force and position of the motor, actuator assembly, or both may be coupled and provide for a predictor corrector relationship so that the estimates are corrected based on the defined system dynamics.

$$Ob = \begin{bmatrix} C \\ CA \\ CA^2 \\ \vdots \\ CA^{n-1} \end{bmatrix} \qquad \text{EQ34}$$

$$Ob = \begin{bmatrix} 0 & 0 & 1 \\ 0 & -\frac{K_b}{L} & -\frac{R}{L} \\ \frac{K_b}{L}\frac{SF'_{si}F_x(t)}{\theta J} & \frac{K_b}{L}\frac{v}{J} + \frac{R}{L}\frac{K_b}{L} & -\frac{K_b}{L}\frac{K_t}{J} + \left(\frac{-R}{L}\right)^2 \end{bmatrix} \qquad \text{EQ35}$$

The theoretical representation of the LTV 300 with gain (L) may be provided in equations EQ36 and EQ37 for continuous time and equations EQ38 and EQ39 for discrete time representation. The gain (L) can be chosen using pole placement techniques to meet system response specifications. Because the system dynamics are time variant, in case of pole placement design criteria, the gain parameters within the vector L are chosen based on the current operating state such that L=f(F) or correspondingly L=f($T_m$).

$$[/\$]\$\char`\^\$\$[/\$]\$\char`\^ A\hat{g}\hat{x}=A\hat{x}+L[y-C\hat{x}]+Bu \qquad \text{EQ36:}$$

$$\hat{y}=C\hat{x}+Du \qquad \text{EQ37:}$$

$$\hat{x}(k+1)=A(k)\hat{x}(k)+L[y(k)-\hat{y}(k)]+Bu(k) \qquad \text{EQ38:}$$

$$\hat{y}(k)=C\hat{x}(k)+Du(k) \qquad \text{EQ39:}$$

Another benefit of the state space methodology may be that the estimated and the measured motor current can be used to adapt internal model based parameters over the life of the actuator assembly. In other words, the spindle factor ($SF_{sa}$, $SF_{sr}$) can be lumped with a thrust bearing and MGU efficiency, and adapted based on an error between the estimated and measured motor current. This degradation adaptation can be used to adapt the overall parking brake system efficiency within the LTV 300 to account for degradation of the actuator assembly. This adaptation desirably decreases the overall estimation error and/or reduces control variation of force and position, which thereby allows for decreased system sizing. Which may ultimately result in reduced weight and system costs. The degradation adaptation can be achieved using equation EQ40 and weighted with respect to prior adaptations to minimize variations in the spindle factor ($SF_{sa}$, $SF_{sr}$) according to EQ41, where $\omega$ is a weight assigned to each adaptation where the sum of the weights is equal to 1.

$$SF_{si}'(k)=SF_{si}'(k-1)+C[i_{clamp}(k-1)-\hat{i}_{clamp}(k-1)] \qquad \text{EQ40:}$$

$$\overline{SF'_{si}(k)} = \sum_{i=0}^{n} \omega_i SF'_{si}(k-i) \qquad \text{EQ41}$$

Figure 7:
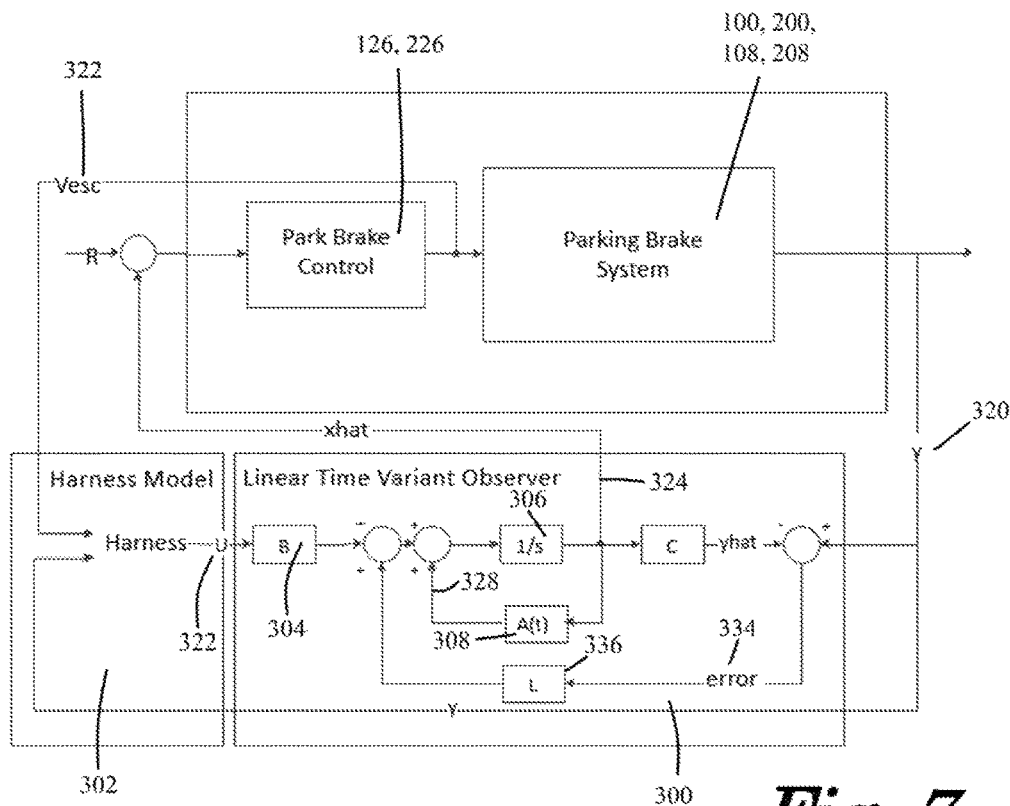
FIG. 7 is a schematic diagram of the LTV monitoring the parking brake system.

FIG. 7 illustrates a schematic diagram of the system. The system includes the brake assembly 100, 200 and actuator assembly 108, 208. It is understood that the harness model subcomponent 302 and the linear time variant observer 300 can be embedded as one or more subcomponents in the control module 126, 226. Motor voltage (U) is measured at 322 and motor current (i) is measured at 320.

As was discussed above at FIG. 5, motor input voltage (u) 322 is measured at 322, which is supplied to the state estimation model 304 to determine estimates of motor position, motor speed, and motor current 324. The estimated motor position 324 and correspondingly park brake force is supplied to the park brake controller 126, 226. The estimated states 324 (xhat) are linearized at the state matrix 308 using feedback linearization based on motor torque load 328 (FIG. 6). Estimated current is also compared to the measured current 320 to determine an error at 334 and gain (L) at 336, which is then fed into the force estimation model 306. This feedback into the force estimation model 306 ensures that the system is updated and corrected based on changes in motor position and clamp force due to wear of the brake pads or brake shoes over time.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in as similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A method of controlling a brake system, the method comprising:
    measuring voltage of a motor;
    measuring current of the motor;
    estimating a rotational angle of the motor using the measured voltage and the measured current;
    estimating a speed of the motor using the measured voltage and the measured current;
    estimating a current draw of the motor using the measured voltage and the measured current;

estimating a brake force with the estimated rotational angle of the motor;
correcting the estimated rotational angle of the motor with the measured current;
correcting the estimated speed of the motor with the measured current;
correcting the estimated current draw of the motor with the measured current;
correcting the estimated brake force with the corrected estimated rotational angle of the motor, the corrected speed of the motor, and the corrected current draw of the motor; and
determining creation of a brake apply with the corrected brake force.

2. The method of claim 1, wherein the creation of the brake apply includes rotating a spindle about an axis with the motor in a first direction so that a nut is moved along an axis in a first direction so that the nut moves one or more brake pads against a braking surface to create the brake force, and
wherein during the creation of the brake apply, a position of the spindle is estimated using the measured voltage and the measured current, and/or the brake force is estimated based on the measured current and the measured voltage.

3. The method of claim 2, wherein releasing of the brake apply includes rotating the spindle about the axis with the motor so that the nut is moved along the axis so that the one or more brake pads move away from the braking surface to release the brake force, and
wherein during the releasing of the brake apply, a position of the spindle is estimated using the measured voltage and the measured current, and/or the brake force is estimated based on the measured current and the measured voltage.

4. The method of claim 1, wherein the creation of the brake apply includes rotating a nut about an axis with the motor in a first direction so that a spindle moves along an axis in a first direction and moves one or more brake shoes against a braking surface to create the brake force, and
wherein during the creation of the brake apply, a position of the spindle is estimated using the measured voltage and the measured current, and/or the brake force is estimated, based on the measured current and the measured voltage.

5. The method of claim 1, wherein release of the brake apply includes: rotating a nut about an axis with the motor so that a spindle moves along the axis and moves one or more brake shoes away from a braking surface to release the brake force, and
wherein during the release of the brake apply, a position of the spindle is estimated using the measured voltage and the measured current, and/or the brake force is estimated based on the measured current and the measured voltage.

6. The method of claim 1, wherein the step of estimating the current draw of the motor includes a step of calculating degradation of the brake system, and
wherein the step of calculating degradation includes considering one or more parameters that are lumped into a spindle factor, the one or more parameters including: spindle friction, effective spindle diameter, spindle lead, gear efficiency, and spindle flank angle.

7. The method of claim 1, wherein the step of measuring the current includes calculating a change of current in the brake system.

8. The method of claim 7, wherein the step of calculating the change of current includes subtracting a harness voltage drop from a measured control module voltage.

9. The method of claim 1, wherein the estimating steps include a step of linearizing a non-linear state space formation using feedback linearization about an operating load of the brake system to determine a verified position of the motor, a verified motor speed, and a verified current draw of the motor, motor current, and/or to determine a verified brake force, and
wherein the step of linearizing the non-linear state space formation using feedback linearization includes a step of estimating motor load torque based on the estimated brake force and linearization model.

10. The method of claim 1, wherein the creation of the brake apply is verified with the corrected brake force.

11. The method of claim 1, wherein the estimated rotational angle of the motor, the estimated speed of the motor, and the estimated current draw of the motor are compared to a subsequently estimated rotational angle of the motor, a subsequently estimated speed of the motor, and a subsequently estimated current draw of the motor to determine an error correction to update the brake system.

12. The method of claim 11, wherein release of the brake apply is verified with the corrected rotational angle of the motor.

13. A method of controlling a parking brake system, the method comprising:
measuring a voltage and measuring a current of the parking brake system during creation of a parking brake apply and during release of the parking brake apply;
estimating a position of a motor and/or a position of a spindle with the measured voltage and the measured current;
estimating a parking brake force with the estimated position of the motor and/or the estimated position of the spindle;
correcting the estimated position of the motor and/or correcting the estimated position of the spindle by using the measured current;
determining the creation of the parking brake apply with a corrected parking brake force; and
determining the release of the parking brake apply with the corrected estimated position of the motor and/or spindle.

14. The method of claim 13, wherein the position of the spindle changes when one or more brake pads are moved by the spindle against a braking surface to create the parking brake apply, and moved away from the braking surface to release the parking brake apply, and
wherein the method includes steps of:
rotating the spindle about an axis with the motor in a first direction so that a nut moves the one or more brake pads against the braking surface to create the parking brake apply, and
rotating the spindle about the axis with the motor in a second direction so that the one or more brake pads move away from the braking surface to release the parking brake apply.

15. The method of claim 13, wherein the method includes a step of estimating a current draw of the motor using the measured voltage and the measured current;
wherein the step of estimating the current draw of the motor includes a step of calculating degradation of the parking brake system, and wherein the step of calculating degradation includes considering one or more parameters that are lumped into a spindle factor, the one or more factors including: gear efficiency, spindle friction, effective spindle diameter, spindle lead, and spindle flank angle.

16. The method of claim 13, wherein the step of measuring the current includes calculating a change of current in the parking brake system, and wherein the step of calculating the change of current includes subtracting a harness voltage drop from a measured control module voltage.

17. The method of claim 13, wherein the release of the parking brake apply is verified using the corrected position of the spindle.

18. The method of claim 13, wherein a step of estimating a current draw of the motor occurs before a step of estimating a speed of the motor, which occurs before the step of estimating the position of the motor.

19. The method of claim 13, wherein the creation of the parking brake apply includes rotating the spindle about an axis with the motor in a first direction so that a nut is moved along an axis in a first direction so that the nut moves one or more brake pads against a braking surface to create the parking brake force, and wherein during the creation of the parking brake apply, the position of the spindle is estimated using the measured voltage and the measured current, and/or the parking brake force is estimated based on the measured current and the measured voltage.

20. The method of claim 13, wherein the release of the parking brake apply includes rotating the spindle about an axis with the motor in a second direction so that a nut is moved along the axis in a second direction so that one or more brake pads move away from a braking surface to release the parking brake force, and wherein during the release of the parking brake apply, the position of the spindle is estimated using the measured voltage and the measured current, and/or the parking brake force is estimated based on the measured current and the measured voltage.

* * * * *